United States Patent [19]

Gracey

[11] Patent Number: 5,226,208
[45] Date of Patent: Jul. 13, 1993

[54] BEARING PULLER

[76] Inventor: Thomas Gracey, P.O. Box 155, Tehachapi, Calif. 93561

[21] Appl. No.: 915,506

[22] Filed: Jul. 20, 1992

[51] Int. Cl.⁵ ............................................. B23P 19/04
[52] U.S. Cl. ................................................ 29/265; 29/263
[58] Field of Search .................................. 29/263-265

[56] References Cited

U.S. PATENT DOCUMENTS

| 170,524 | 11/1875 | Chapman . | |
| 1,171,590 | 2/1916 | Campbell | 29/263 |
| 1,385,452 | 7/1921 | Hoffman . | |
| 1,493,534 | 5/1924 | Hardin . | |
| 1,710,835 | 4/1929 | Nielsen . | |
| 2,113,755 | 4/1938 | Billington . | |
| 2,380,980 | 8/1945 | Looney . | |
| 3,056,191 | 10/1962 | Felmet . | |
| 3,174,218 | 3/1965 | McConaha . | |
| 3,340,593 | 9/1967 | Savastano . | |
| 3,408,724 | 11/1968 | Hoeijenbos . | |
| 3,762,021 | 10/1973 | Racin . | |
| 4,207,664 | 6/1980 | Zoula | 29/265 |
| 4,235,004 | 11/1980 | Floyd . | |

Primary Examiner—Robert C. Watson
Attorney, Agent, or Firm—Kenneth G. Pritchard

[57] ABSTRACT

A split nut blind hole bearing puller is made by using an elongated split nut with a bearing flange which is assembled with the blind hole behind a bearing. A retainer fits over the assembled split nut so a puller bolt can be screwed through the assembled split nut into the blind hole.

3 Claims, 2 Drawing Sheets

BEARING PULLER

BACKGROUND OF THE INVENTION

1. Field of the Invention

This invention pertains to devices and methods for removing bearings and similar items. Specifically this invention pertains to devices and methods for removing bearings mounted in front of a blind hole.

2. Description of the Prior Art

Bearing for flywheels and other similar applications are frequently mounted in situations where the bearing can only be accessed from one side. Space is normally left behind the bearing that can only be reached through the bearing. This space is commonly referred to as a blind hole.

After bearings have been used for a while, they tend to become firmly seated. When the bearing needed to be removed or replaced the blind hole provides a limited space to reach behind the bearing. In the past various multiple jaw or finger pullers were used to grasp the bearing. Inclined planes were used to pry them out. In desperation cutting torches are sometimes used to remove the bearing All of the previous devices have had limited effect in applying force to the blind hole side of the bearing.

Accordingly, it is an object of the present invention to provide a device which applies pressure directly behind the bearing or from the blind hole side to remove the bearing. Further it is an object of the present invention to describe a method for removing bearings by driving them straight out from the blind hole side.

SUMMARY OF THE INVENTION

In one embodiment of this invention, an elongated nut is divided into two pieces. The inner surface of the nut is threaded. A bearing flange is mounted to one end of the nut and is likewise divided into two pieces. When the nut is inserted into a bearing and the pieces aligned, a retainer is placed over the elongated nut to hold it in place. The retainer is in turn held in place so no rotation of the retainer and nut can occur. A threaded puller bolt is then screwed into the elongated nut. When the puller bolt makes contact with the surface of the blind hole behind the bearing to be removed, the rotational force turning the puller bolt is converted to linear force on the bearing directly away from the blind hole.

In another embodiment of the invention, the two pieces of the elongated nut are symmetrical halves.

DESCRIPTION OF THE PREFERRED EMBODIMENT

Figure 1:
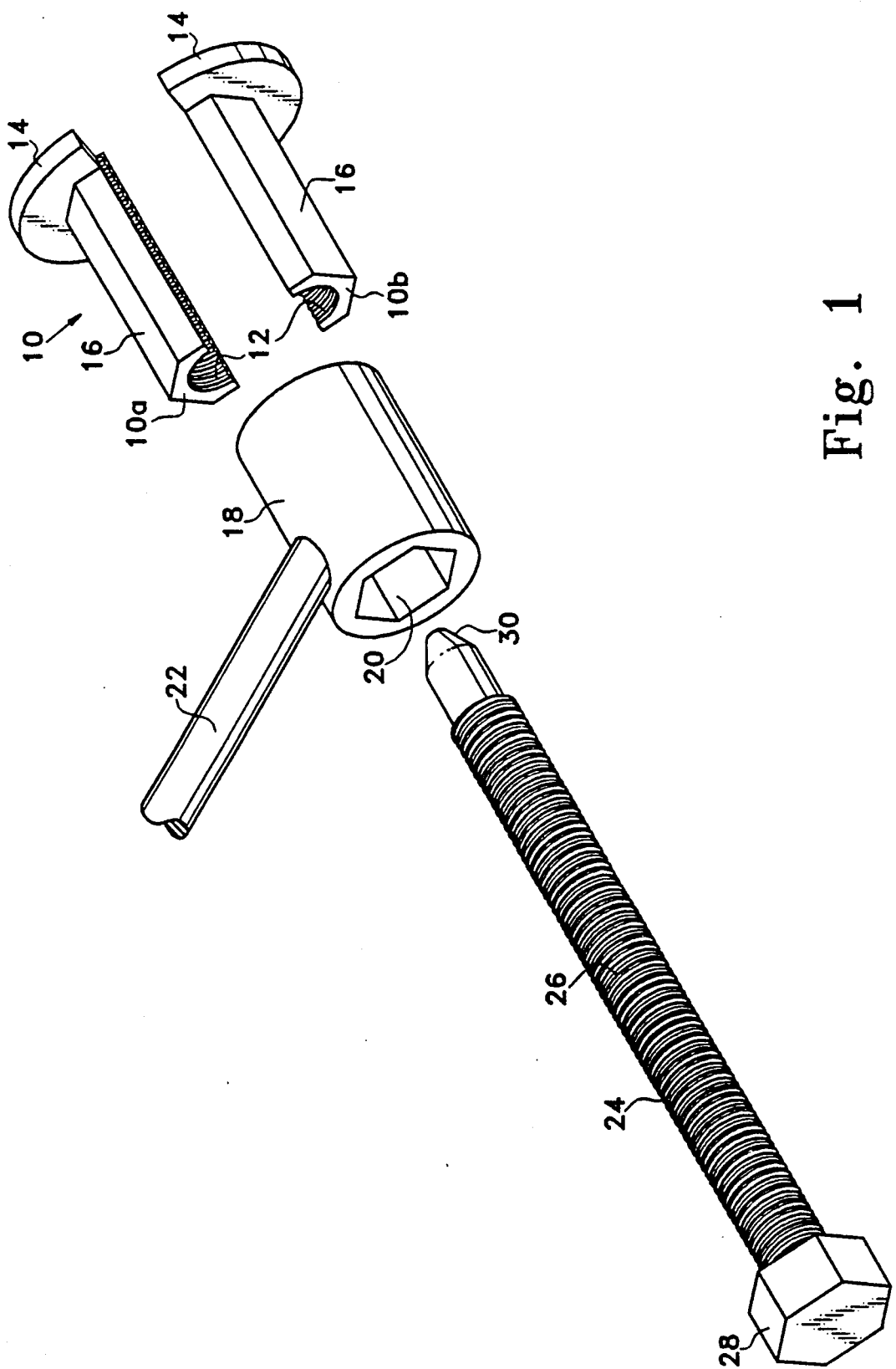
FIG. 1 is a disassembled perspective view of the present invention.

In FIG. 1, an elongated nut 10 is divided into two pieces, 10a and 10b. For purposes of simplicity 10a and 10b can be symmetric halves. Elongated nut 10 has an inner surface 12 which is threaded so a continuous threaded path is formed when 10a and 10b are assembled to form a single elongated nut 10.

On one end of elongated nut 10, a bearing flange 14 is mounted. Bearing flange 14 can be mounted by welding, forging or any other method. Both elongated nut 10 and bearing flange 14 can be made of metal such as steel.

An outer surface 16 of elongated nut 10 is shaped into any predesired shape except smooth cylindrical. A hexagonal shape is shown for purposes of example. However, square, octagonal or other could be used.

A retainer 18, made of metal or other relatively strong material is made with an inner surface 20 that fits over outer surface 16. By eliminating a smooth cylindrical shape, retainer 18 holds elongated nut 10 when assembled and prevents elongated nut 10 from rotating. In turn a fastening device such as handle 22 is mounted to retainer 18. If metal is used, handle 22 can be welded to retainer 18. Handle 22 provides a way to hold retainer 18 so retainer 18 does not rotate.

The last item to the invention is puller bolt 24. Puller bolt 24 has threads 26 which have an outside diameter equal to the inside diameter of elongated nut 10 threads 12. By screwing puller bolt 24 into elongated nut 10 while elongated nut 10 is within retainer 128, elongated nut 10 effectively functions as a solid piece nut. Puller bolt 24 can have a head 28 which is hexagonal or other shape to be chosen. The other end 30 of puller bolt 24 may be tempered to minimize cutting into the surface of a blind hole as will be shown below.

Figure 2:
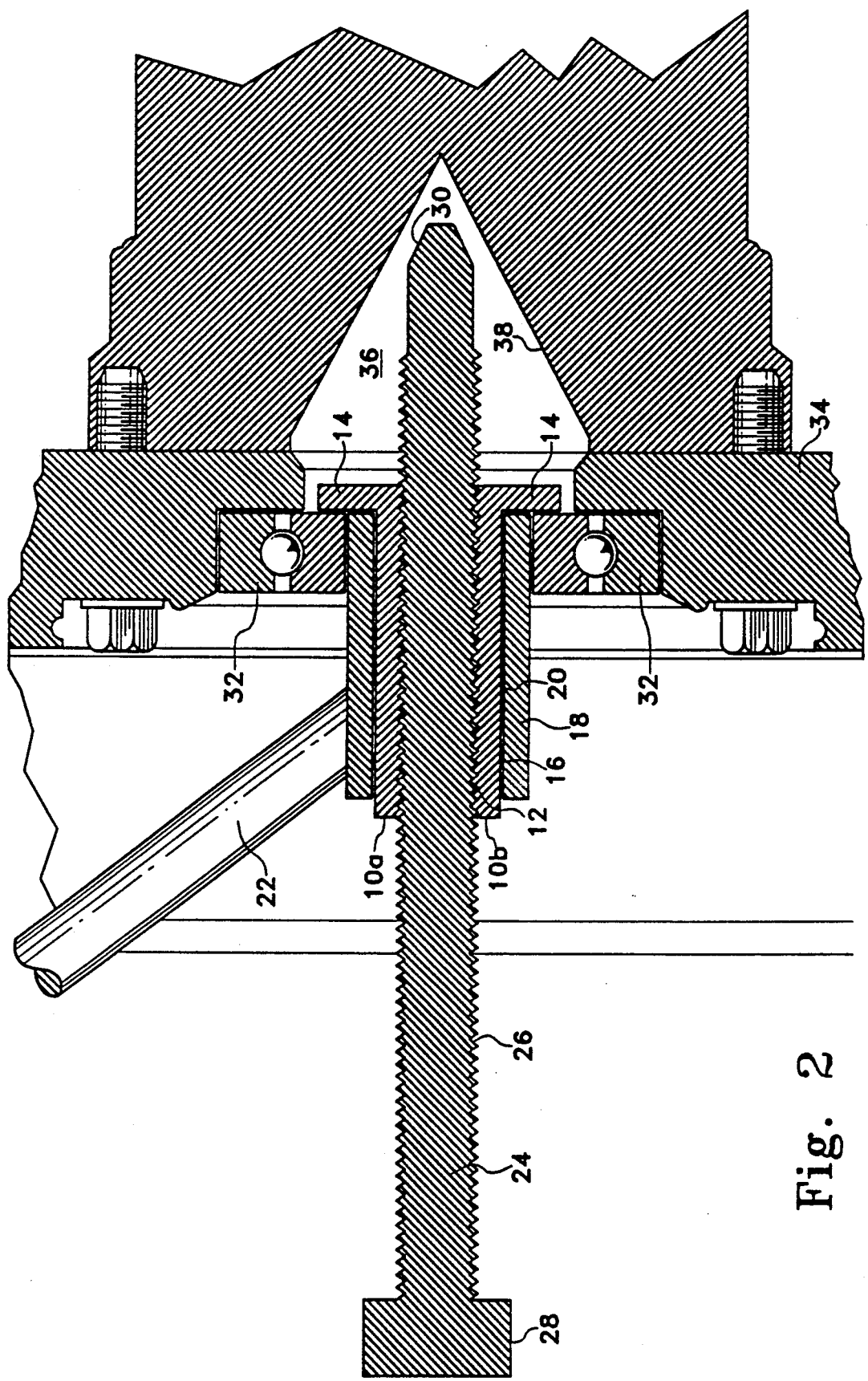
FIG. 2 is a cross-sectional view of the present invention.

FIG. 2 shows a cross section of the present invention as it is used to remove a bearing 32 from a mount 34. Blind hole 36 is the space behind bearing 32. Blind hole 36 has a surface 38.

By being divided, each half of elongated nut 20 is inserted into bearing 32 to form an assembly. As shown, retainer 18 is inserted over elongated nut 10 and into bearing 32. This embodiment makes it easier to insert elongated nut 10 into bearing 32 because the outer diameter of elongated nut 10 is less than the inner diameter of bearing 32.

As puller bolt 24 is screwed into retained elongated nut 10, end 30, which may be tapered as shown, contacts blind hole surface 38. Continued turning of puller bolt 24 applies pressure to the inner surface of bearing 32 via bearing flanges 14. Handle 22 is held to prevent rotation of retainer 18 which in turn prevents rotation of elongated nut 10. Head 28 can be screwed via impact wrench or hand tools; an impact wrench probably being the more practical.

What is claimed is:

1. A blind hole bearing puller comprising:
   an elongated nut divided into two halves, said elongated nut having a threaded inner surface which is continuous when said halves are placed together and a preshaped outer surface,
   a bearing flange mounted on said elongated divided nut;
   a retainer with an inner surface contoured to match said preshaped outer surface of such elongated divided nut such that said retainer will slide over both halves of said elongated divided nut so as to hold said elongated divided nut and not permit said elongated divided nut to turn within said retainer;
   a handle attached to said retainer; and
   a puller bolt threaded to match said threaded inner surface of said elongated nut.

2. A blind hole bearing puller as described in claim 1 further comprising said bearing flange being molded from the same material as the elongated divided nut.

3. A blind hole bearing puller as described in claim 1 where said two halves of said elongated nut are symmetrical.

* * * * *